April 23, 1957 H. B. CORSAW 2,789,613
KEY HOLDER
Filed April 21, 1955 3 Sheets-Sheet 1
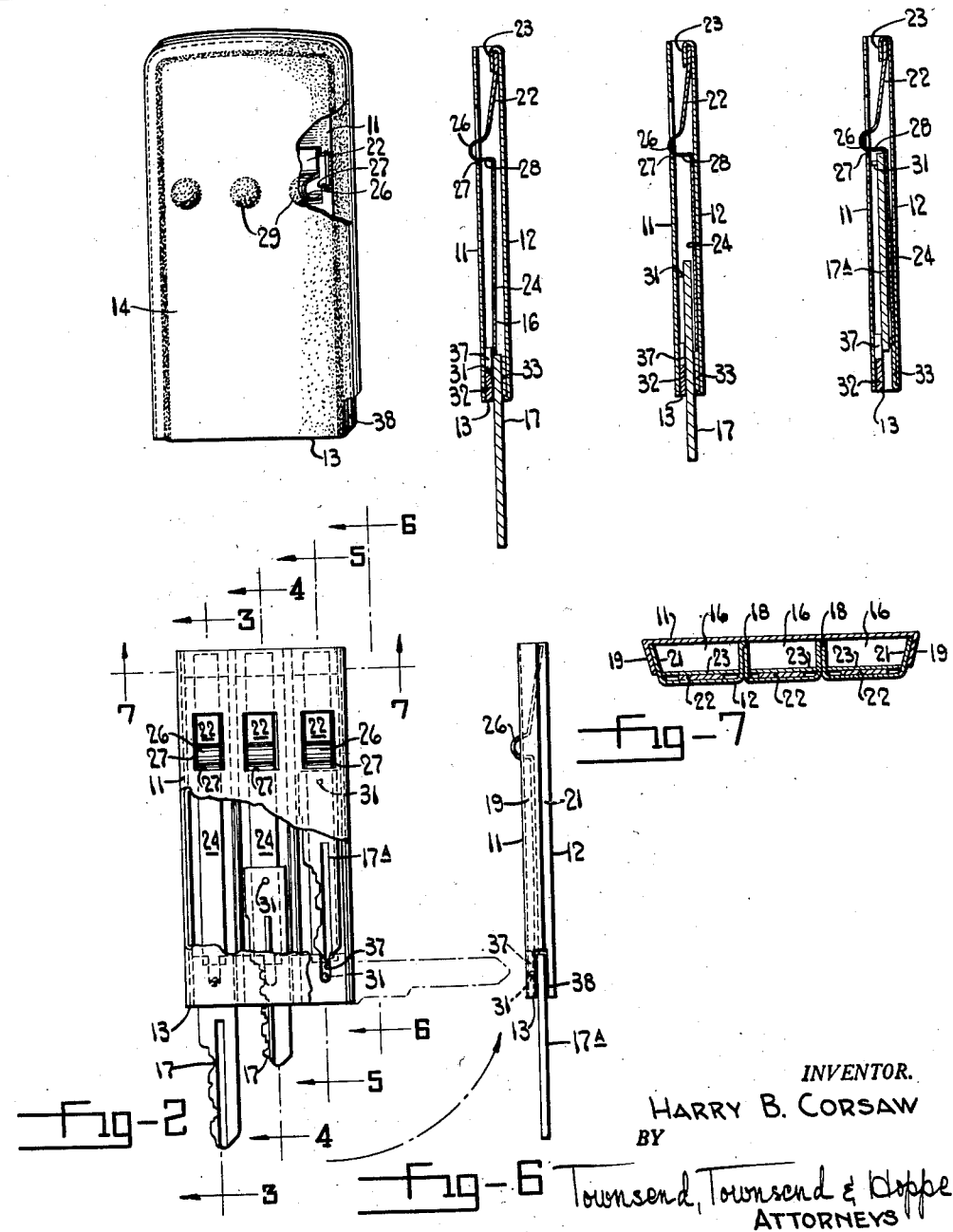
INVENTOR.
HARRY B. CORSAW
BY
Townsend, Townsend & Hoppe
ATTORNEYS April 23, 1957     H. B. CORSAW     2,789,613
KEY HOLDER
Filed April 21, 1955     3 Sheets-Sheet 2
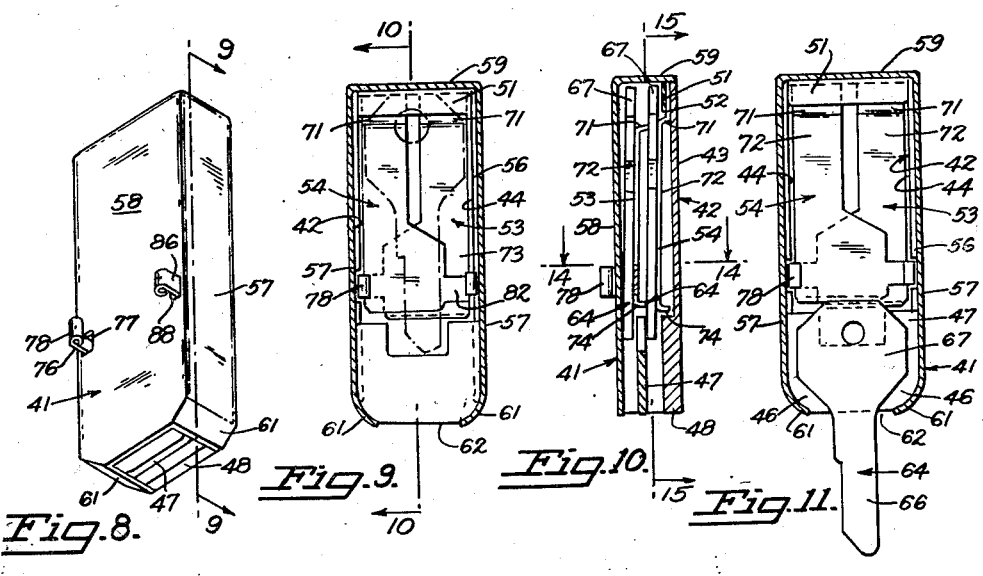
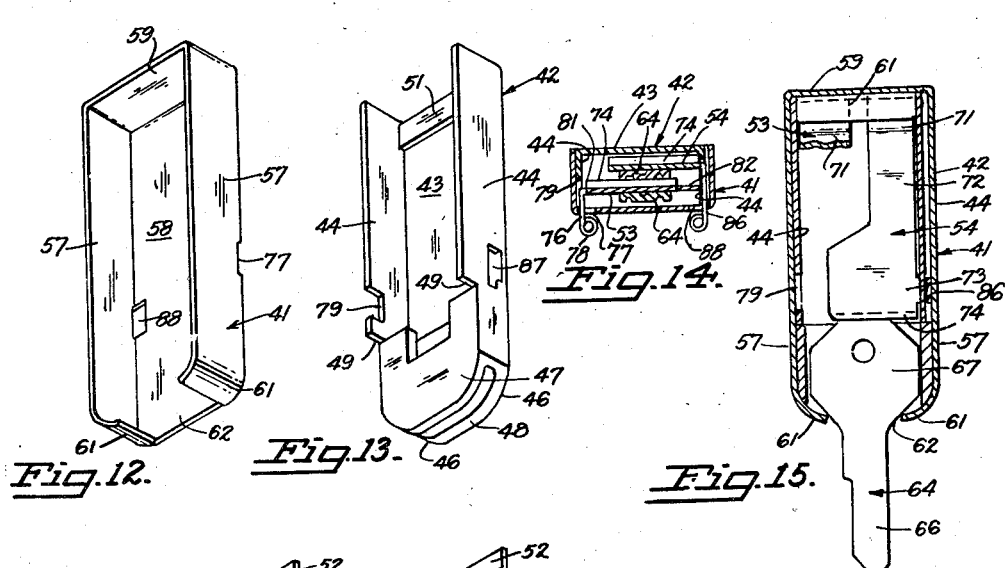
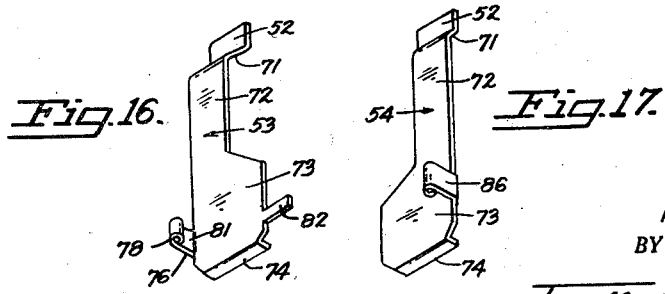
INVENTOR.
HARRY B. CORSAW
BY
Townsend, Townsend and Hoppe
ATTORNEYS

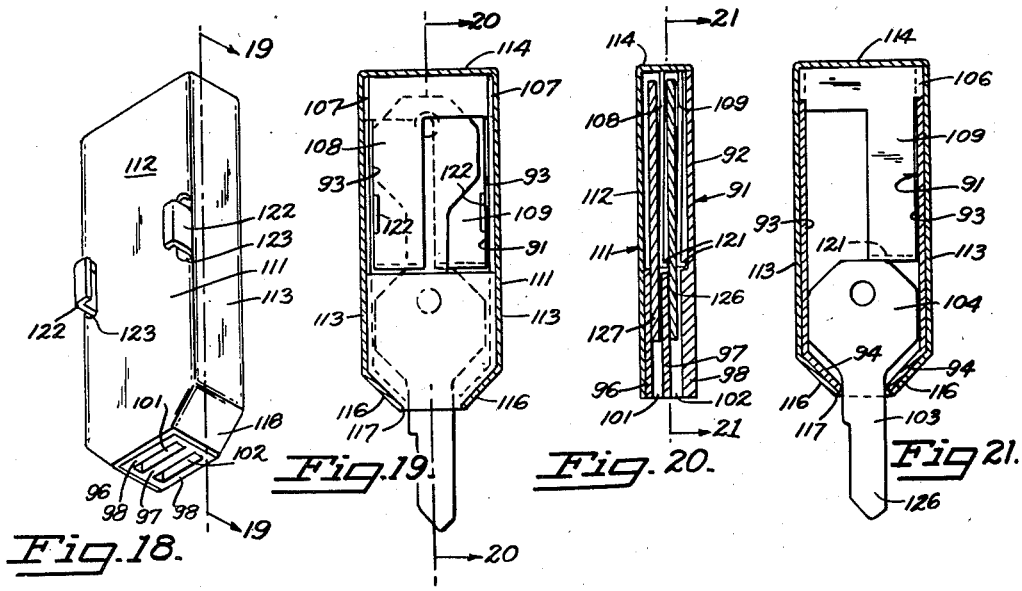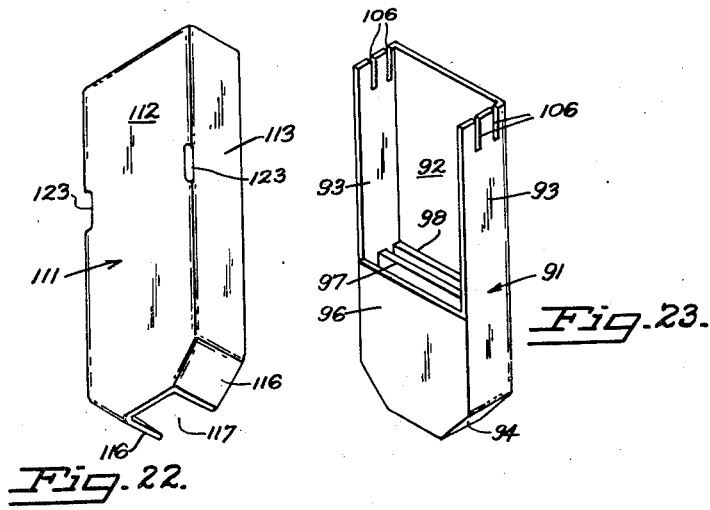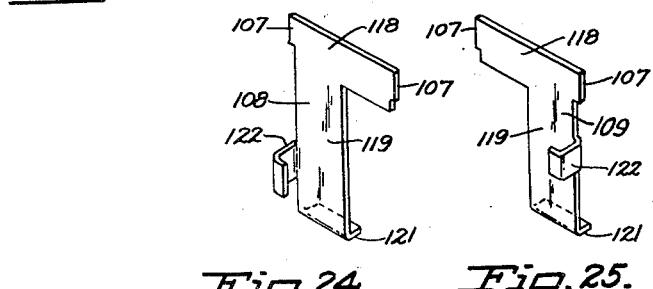

United States Patent Office 2,789,613
Patented Apr. 23, 1957

2,789,613

KEY HOLDER

Harry B. Corsaw, Palo Alto, Calif.

Application April 21, 1955, Serial No. 502,915

9 Claims. (Cl. 150—40)

This invention relates to a new and improved key holder for one or more keys. Reference is made to my co-pending patent application Serial No. 438,955 filed June 24, 1954 now abandoned for key holder, of which this application for patent is a continuation-in-part.

In accordance with this invention, keys may be retracted inside a housing and held in retracted position when not in use. By pushing a button any of a plurality of keys may be released from retracted position and allowed to slide by gravity so that the key projects outside the housing, means being provided to prevent disengagement of the key from the housing. When in extended position the key is latched so that it cannot retract inside the case until desired.

The present invention further provides means whereby upon pushing the same button which permits extension of the key, the latch holding the key in extended position is released permitting the key to slide by gravity into retracted position.

Another feature of the invention is the provision of means whereby at least one key can be pivoted in extended position at right angles to the casing, a position which particularly facilitates use for the ignition of an automobile and the like. When turned at right angles, the housing depends close to the dashboard and does not project out as far into the driver's compartment as would otherwise be the case.

Another object and advantage of certain modifications of the invention hereinafter set forth is the fact that standard keys may be employed in the invention, thereby eliminating the necessity of making specially formed keys or adding attachments to standard keys.

A further feature of the invention is the ease with which keys may be installed and removed when it is desired to add or remove keys.

Other objects of the present invention will become apparent upon reading the following specification and referring to the accompanying drawings in which similar characters of reference represent corresponding parts in each of the several views.

In the drawings:

Fig. 1 is a perspective view of a key holder formed in accordance with this invention, partially broken away to reveal portions of the interior thereof.

Fig. 2 is a plan of the housing of the holder partially broken away to reveal the interior construction.

Fig. 3 is a longitudinal vertical section substantially along the line 3—3 of Fig. 2 and showing a key in extended position.

Fig. 4 is a longitudinal vertical section taken substantially along the line 4—4 of Fig. 2 and showing a key partially retracted.

Fig. 5 is a longitudinal vertical section taken substantially along the line 5—5 of Fig. 2 and showing a key completely retracted.

Fig. 6 is a side elevation as viewed from the direction of line 6—6 of Fig. 2.

Fig. 7 is a transverse vertical section taken substantially along the line 7—7 of Fig. 2.

Fig. 8 is a perspective view of the exterior of a modified key holder.

Fig. 9 is a longitudinal vertical sectional view taken substantially along the line 9—9 of Fig. 8.

Fig. 10 is a longitudinal sectional view taken substantially along the line 10—10 of Fig. 9.

Fig. 11 is a view similar to Fig. 9 showing one of the keys in projected position.

Fig. 12 is a perspective view of one of the parts of the casing of the key holder.

Fig. 13 is a perspective view of the other part of the casing of the key holder.

Fig. 14 is a transverse sectional view taken substantially along the line 14—14 of Fig. 10.

Fig. 15 is a sectional view taken substantially along the line 15—15 of Fig. 10.

Fig. 16 is a perspective view of one of the springs employed.

Fig. 17 is a perspective view of the other spring employed.

Fig. 18 is a perspective view of a further modification of the invention.

Fig. 19 is a longitudinal vertical sectional view taken substantially along the line 19—19 of Fig. 18.

Fig. 20 is a longitudinal vertical section taken substantially along the line 20—20 of Fig. 19.

Fig. 21 is a sectional view taken substantially along line 21—21 of Fig. 20.

Fig. 22 is a perspective view of one of the halves of the casing of the keyholder of the modification of Fig. 18.

Fig. 23 is a perspective view of the other half of the casing.

Fig. 24 is a perspective view of one of the springs employed in the modification of Fig. 18.

Fig. 25 is a perspective view of the other spring employed in the modification of Fig. 18.

The present invention as embodied in Figs. 1 to 7 inclusive employs a front and a back housing section 11 and 12 joined together as by telescoped side edges. One end 13 of the housing is open. Preferably, the housing may be contained within a leather or other flexible casing 14. The back housing section 12 is provided with means dividing the same into a plurality of channels 16 which receive keys 17, there being one channel for each key. As shown particularly in Fig. 7, the division of the back housing section into channels may be accomplished by forming reverse bends 18 in back 12, but it will be understood that the channels may be formed in a variety of other ways. The side edges 19 and 21 of the front and back are disposed at acute angles with respect to the front wall 11, and telescoped together as particularly shown in Fig. 7.

Each channel 16 contains a flat leaf spring 22, the upper end of the spring being secured in the channel by folding the end 23 of the back inwardly and clipping the upper end of the spring. The lower portion 24 of the spring extends to a position adjacent but spaced inwardly from the open bottom end 13 of the housing. Intermediate its length, spring 22 is formed with a bight 26 which projects outwardly through a hole 27 in the front housing section. The underside 28 of bight 26 is substantially perpendicular to the lower portion 24 of the spring. The spring 22 is initially stressed so that the lower portion 24 is biased toward the front housing section 11 and by depressing the bight 26 the biasing effect of the spring is overcome. The flexible casing 14 is marked with spots 29 or other indicia immediately above the bight 26 so that by pressing the flexible casing inwardly on the indicator, the spring pressure is overcome.

The keys 17 are formed without the enlarged heads of conventional keys and have a maximum width slightly less than the channels 16 in which they fit. The keys are formed with retainer pins 31 projecting forwardly from the edge of their upper ends. The inside of the front housing section is provided with a transverse enlarged portion 32 at its lower edge. The lower edge of the back housing section is also provided with a thickened portion 33 along the lower edge which is of a thickness at least equal to the thickness of spring 22. The thickened portion 33 on the back housing section prevents the upper edge of the key from wedging under the lower end of the spring.

Each key 17 is provided with a pin or lug 31 adjacent its upper end and the thickened reinforcing portion 32 is formed with a downwardly extending slot 37. Thus in extended position the pin 31 fits into slot 37 and this prevents the key from being dislodged from the holder. It will be noted that the lower end of spring 24 fits under enlarged portion 32.

Right-hand key 17a operates in somewhat different manner than the others. The top and bottom housing section and also the leather case are cut away in slots 38 at the side so that the key 17a may be swung around at a right angle to the housing as shown in dot-and-dash lines in Fig. 2, pin 31 pivoting in the end of slot 37.

In use, in order to install a key, the front housing section 11 is removed and the key slipped into the channel 16 and under enlarged portion 32. The key rests on top of the leaf spring 22 which is secured to the back housing section. Spring 22 biases the pin 31 on each key against the inside of the front housing section which creates a frictional drag against movement of the key in channel 16. However, when the bight 26 of the spring 22 is depressed, the spring is out of engagement with the key and hence the pin 31 is not biased against the front housing, thereby permitting the key to slide in its channel.

When the key is in retracted position, the upper end of the key engages against the lower edge 28 of the bight 26, thereby limiting the inward movement of the key (see Fig. 5). When it is desired to project one of the keys, bight 26 is depressed; if a casing 14 is employed, depression of the bight is accomplished by pressing the spot 29 on the casing 14 immediately above the bight 26 of the spring in the channel of the key to be projected. Depression of bight 26 releases the spring from contact with the key and allows the key to slide outwardly by gravity (see Fig. 4). When the key reaches the limit of its outward movement, the pin 31 engages in slot 37 thereby preventing further extension of the key. At the same time, the lower end of lower portion 24 of the spring 22 moves into position against the key, preventing the key from moving inwardly (Fig. 3).

The right-hand end key 17a is projected in the same manner as the other keys except that at the limit of its projected movement the key may be pivoted through a 90° angle to a position shown in dot-and-dash lines in Fig. 2.

When it is desired to retract the key, the bight 26 is depressed, which moves the end of the spring 22 toward the back housing section out of contact with the key. Inasmuch as the spring 22 is out of contact with the key as long as bight 26 is depressed, the key may slide inside the housing by gravity or manual movement. When the key is fully retracted, the upper end of the key rests against the lower edge 28 of bight 26. When pressure on the bight 26 is released, spring 22 biases the pin 31 against the front housing 11 creating a frictional resistance to outward movement of the key which functions to retain the key in retracted position.

A modification of the invention is shown in Figs. 8 to 17 inclusive. This modification differs from that set forth in Figs. 1 to 7 inclusive, in that standard keys may be employed. It is further observed that when a multiplicity of keys are contained, the keys are positioned one above the other, rather than being positioned side by side as in the previous modification.

Top and bottom casing sections 41 and 42 are provided and are fitted together in telescopic fashion along their side edges. The assembled casing may be contained within a leather or other flexible casing (not shown) as in the previous modification. The bottom casing section 42 is provided with a bottom panel 43 which extends the length of the key holder, having integral upturned sides 44. The bottom corners of the sides are beveled as indicated by reference numeral 46 and a beveled partition 47 is mounted adjacent the lower end of the bottom section. Partition 47 comprises a flat member, disposed parallel to and spaced upwardly from bottom panel 43. A flat spacer 48 is formed on bottom panel 43 immediately below the partition 47 so that the top surface of the spacer 48 is spaced above the level of the bottom panel 43. The sides 44 are cut away as indicated by reference numeral 49 to the level of the top surface of partition 47. The back of the bottom casing section is open and the rear edge is folded over in a fold 51 to receive the rear extremities 52 of the springs 53 and 54, as hereinafter appears.

The top casing section 41 is slightly wider than the bottom casing section 42 so that in assembled position there is a space 56 between the sides 44 and 57 of the bottom and top casings, respectively. The purpose of space 56 hereinafter appears. The top casing section 41 comprises a top panel 58 having integral downwardly turned sides 57 which are of substantially the same height as the sides 44. An integral back end 59 on the top casing section 41 is provided to close off the rear. The front corners of the front casing section 41 are formed with inwardly-forwardly converging wings 61 which fit over the beveled front corners 46 of the bottom casing section 42. The gap 62 between the inner edges of wings 61 permits the projection of the shank 66 of a key 64 contained in the key holder but prevents projection of the head 67 of the key so long as the two casing sections are in assembled position.

The top leaf and bottom leaf springs 53 and 54 are for the purpose of frictionally engaging the keys 64 to prevent their unintentional withdrawal from the casing and accordingly are formed of a resilient material, such as brass. Each leaf has a narrow rear extremity 52 which is engaged and retained by the fold 51 at the rear of the bottom casing. An upwardly offset extension 71 is formed forwardly of extremity 52 of each leaf and an extended shank portion 72 is formed forwardly of the offset portion 71. The forward end of the shank 72 merges into a pad 73 which is of a width greater than the shank and the front of the pad 73 is formed with a downwardly turned flange 74 which has a height substantially equal to the thickness of a conventional key 64.

Offset extension 71 of the top leaf 53 is longer than that of bottom leaf 54 so that the shank 72 and pad 73 of top leaf 53 are disposed higher than the corresponding portions of bottom leaf 54. Further the shanks of the two leaves are located on opposite sides of the casing so that both rear extremities 52 may be retained by a single fold 51. With key 64 in retracted position, pad 73 bears against the key 64 and frictionally resists withdrawal of the key from inside the casing. Upwardly turned stem 76 of top leaf 53 projects up through a slot 77 formed at the corner edge of the front casing section. When the rolled terminus 78 of the stem 76 is depressed, the top leaf is depressed until its pad 73 is at the same level as the upper surface of the partition 47. Upon turning the key holder so that the gap 62 is downwardly, key 64 slides outwardly of the casing by gravity. To limit downward movement of pad 73, a shoulder 79 is cut in the side 44 to receive a short laterally offset portion 81 of stem 76. To maintain leaf 53 properly aligned, an oppositely directed laterally offset finger 82 bears against the opposite side 44. When the key 64 is in projected position, the flange 74 fits behind the inner end of the key and restrains unintentional retraction of the key until the terminus 78 is depressed.

On bottom leaf 54, stem 86 extends laterally out through a slot 87 in the side 44 of the bottom casing section and then is bent upwardly along the outside of the side 44 of the bottom casing in the space 56, projecting upwardly through a slot 88 at the corner of the top casing section immediately opposite slot 77.

A further modification of the invention is illustrated in Figs. 18 through 25, inclusive. This modification differs from the preceding one in that the keys may be loaded into the holder from the back and in a modified means of retaining the leaf springs in the bottom casing.

The bottom casing section 91 is provided with a back panel 92 and integral upturned sides 93. The forward corners of the bottom casing are beveled with inwardly-forwardly converging wings 94 which restrict outward movement of the keys contained in the casing as hereinafter appears. The forward end of the bottom casing section is provided with a top 96, a middle partition 97, and a spacer 98 on the upper surface of bottom panel 92 providing two slots 101 and 102 having a width substantially equal to the thickness of a conventional key through which the shank 103 of keys may project. The wings 94 restrain projection of the head 104 of the key. It will be observed particularly with reference to Fig. 23 that the back of the bottom casing section 91 is open so that the keys may be installed through the back. In order to hold the bottom and top leaf springs in position, slits 106 are formed in the sides 93 to receive the outer edges 107 of the rear ends of the springs 108 and 109.

The top casing section 111 is formed with a top panel 112 of slightly wider dimension than bottom panel 92 of the bottom casing section and is further provided with integral sides 113 and back 114. Inwardly tapering wings 116 are formed on the front edges of the sides 113 leaving an aperture 117 in the front through which the shank 103, but not the head 104, of a key may project.

Each spring 108 and 109 has a forwardly extending shank 119 extending forwardly of the wide rear extremity 118, the shank of one spring being on the opposite side of the casing from the shank of the opposite spring. Shanks 119 terminate in downturned flanges 121 which are located immediately behind middle partition 97 and spacer 98. An upwardly projecting stem 122 protrudes through a slot 123 in the corner of top casing section 111.

The bottom leaf spring 109 is deformed upwardly so that it bears against the under side of the bottom key 126 positioned in the holder and frictionally engages the same, biasing the key against the under side of the partition 97. Upper spring 108 is deformed upwardly so as frictionally to engage top key 127 and bias the same against the under surface of the top 96 of the bottom casing section 91.

The key holder shown in Figs. 18 to 25 inclusive is loaded from the back as has been explained. In order to accomplish this operation the top casing section 111 is removed, thereby providing access to the open back of the bottom casing section 91. In retracted position, the keys are retained by the force of springs 108 and 109 engaging the key. When one or the other stems 122 is depressed and the holder positioned with slots 101 and 102 downward, the corresponding key slides out of the holder until its shank 103 is exposed, but its head 104 is retained inside the holder by the wings 94 and 116. When the key is fully extended, the flange 121 engages behind the inner end of the key and prevents the key from retracting inside the casing. When the stem 122 is depressed, the flange 121 is depressed, permitting the key to slide back inside the holder.

Although I have specifically shown and described several embodiments of the invention, it is appreciated that other modifications within the scope of the invention as defined in the claims may be practiced. Thus, for example, although I have used the world "pin" to designate the upward extending element 31 in the embodiment of the key structure shown in Figs. 1–7 inclusive, it is appreciated that the element 31 may take the form of a lug or other similar projection. Further, it is also believed apparent that other key arrangements than those shown in the drawings might also be made, as, for example, it is contemplated that it may be desirable to arrange standard head keys of the type illustrated in Figs. 8–20 in side-by-side arrangement such as shown in Figs. 1–7, or, conversely, to arrange the specially fabricated keys shown in Figs. 1–7 one above the other in the general manner shown in Figs. 8–20.

Although the foregoing invention has been described in some detail by way of illustration and example for purposes of clarity of understanding, it is understood that certain changes and modifications may be practiced within the spirit of the invention and scope of the appended claims.

What is claimed is:

1. A key holder comprising a housing open at least at one end and having substantially parallel front and back walls, first means forming at least one longitudinally extending channel interiorly of said housing, a spring in said channel, second means securing said spring in said channel and biasing said spring toward one of said walls, one of said walls being formed with an aperture in registry with said channel, third means associated with said spring and extending through said aperture operative when pressure is applied thereto to move said spring in a direction away from the wall toward which it is biased, a key in said channel extensible and retractable through the open end of said housing, said key being located in retracted position between said spring and the wall toward which said spring is biased, and cooperating fourth means on said key and housing to retain said key in said housing against accidental dislodgment.

2. A key holder according to claim 1 in which said spring terminates spaced inward from the open end of said housing and said fourth means holds the inner end of said key when said key is in extended position immediately below the end of said spring, the end of said spring engaging the inner end of said key to hold said key in extended position.

3. A key holder according to claim 2 which further comprises means having a thickness substantially equal to the thickness of said spring adjacent the open end of said housing located on the wall thereof opposite the wall toward which said spring is biased and located below the end of said spring, said last named means being operable to prevent entry of said key underneath said spring.

4. A key holder according to claim 1 which further comprises a flexible case over said housing, said case having an indicator in registry with the aperture in said housing.

5. A key holder according to claim 1 in which said third means comprises a bight formed intermediate the ends of the spring and partially projecting out through the aperture in said wall.

6. A key holder according to claim 5 in which said bight engages the inner end of said key in retracted position to limit inward movement of said key.

7. A key holder according to claim 1 in which said fourth means comprises a pin on said key and a projection on the inner face of the wall of said housing against the inner end of which said pin engages.

8. A key holder according to claim 1 in which said fourth means are pivoted and said housing is slotted along one side edge adjacent the open end thereof to permit movement of said key to a position at a right angle to said housing.

9. A key holder according to claim 1 in which said fourth means comprises a pin on said key and a projection on the inner face of the wall of said housing, said projection having a slot extending from its inner edge into which said pin extends when said key is extended, said housing being slotted along one side edge adjacent the open end thereof to permit pivotal movement of said key at right angles to said housing.

References Cited in the file of this patent

UNITED STATES PATENTS

| | | |
|---|---|---|
| 1,859,158 | Pernek, Sr. | May 17, 1932 |
| 1,885,957 | Singleton | Nov. 1, 1932 |
| 2,008,398 | Mangan | July 16, 1935 |
| 2,076,895 | Johnston | Apr. 13, 1937 |
| 2,306,970 | MacPherson et al. | Dec. 29, 1942 |
| 2,322,920 | Campbell | June 29, 1943 |
| 2,371,308 | Mosch | Mar. 13, 1945 |
| 2,517,500 | McPherson et al. | Aug. 1, 1950 |
| 2,669,859 | Hudson, Jr. | Feb. 23, 1954 |